United States Patent
Ogura et al.

[19]

[11] Patent Number: 5,904,088
[45] Date of Patent: May 18, 1999

[54] BRAKE BOOSTER APPARATUS FOR A VEHICLE

[75] Inventors: Osamu Ogura, Okazaki; Kenichi Sato, Nagoya, both of Japan

[73] Assignee: Aisin Seiki Kabushiki Kaisha, Kariya, Japan

[21] Appl. No.: 08/938,834

[22] Filed: Sep. 26, 1997

[51] Int. Cl.⁶ .................................................. F15B 9/10
[52] U.S. Cl. .................................................. 91/376 R
[58] Field of Search .................................. 91/376 R

[56] References Cited

U.S. PATENT DOCUMENTS

| | | |
|---|---|---|
| 5,520,086 | 5/1996 | Ikeda . |
| 5,590,578 | 1/1997 | Ikeda ................................. 91/376 R X |
| 5,651,300 | 7/1997 | Ikeda et al. ....................... 91/376 R X |
| 5,704,271 | 1/1998 | Ikeda ................................. 91/376 R X |
| 5,782,159 | 7/1998 | Gautier et al. .................... 91/376 R X |
| 5,826,484 | 10/1998 | Gautier et al. ........................ 91/376 R |

FOREIGN PATENT DOCUMENTS

| | | |
|---|---|---|
| 8-113137 | 5/1996 | Japan . |
| 2157378 | 10/1985 | United Kingdom ................ 91/376 R |

*Primary Examiner*—John E. Ryznic
*Attorney, Agent, or Firm*—Burns, Doane, Swecker & Mathis, L.L.P.

[57] ABSTRACT

A vehicle brake booster apparatus includes a housing, a movable wall positioned within the interior of the housing to divide the interior into a constant pressure chamber and a variable pressure chamber, a power piston connected to the movable wall for moving in response to movement of the movable wall, an axially movable input rod extending outwardly from the power piston for connection to a brake pedal, and an axially movable valve plunger mounted within the power piston and operatively connected to the input rod. A control valve is positioned within the power piston for controlling communication of the variable pressure chamber with atmospheric air. The control valve includes an air control valve and a vacuum control valve, with the air control valve including an air control seal arranged between the valve plunger and a valve body portion of the control valve. The air control seal has a radially outwardly located peripheral portion which possesses an elasticity that is greater than the elasticity of a radially inwardly located portion of the air control seal to thereby provide an effective air-tight seal.

18 Claims, 3 Drawing Sheets

BRAKE BOOSTER APPARATUS FOR A VEHICLE

FIELD OF THE INVENTION

The present invention generally relates to a brake booster apparatus. More particularly, the present invention relates to vacuum type brake booster apparatus for use in a vehicle brake system, wherein the apparatus includes a control valve which controls communication between a variable pressure chamber and atmospheric air.

BACKGROUND OF THE INVENTION

Japanese Patent Laid-Open Publication No. 8-113137 discloses a brake booster apparatus for a vehicle that is provided with a control valve to control the pressure balance between a constant pressure chamber and a variable pressure chamber. This apparatus includes a diaphragm that divides the interior of a housing into a constant pressure chamber and a variable pressure chamber, power piston, a valve plunger and a control valve. The control valve is defined by a vacuum control valve and an air control valve arranged in the axial direction. These control valves include a vacuum control seal (first seat portion) and an air control seal (second seat portion) respectively. The air control seal is interposed between a valve body and a valve seat which is formed at the input side edge portion of the valve plunger. The air control seal also includes a ring shaped plate.

When the air control seal is assembled into the valve body, the air control seal changes shape when it is mounted at a predetermined position. However, in this assembly process, the air seal is deformed and so a precise valve seat arrangement cannot be established. As a result, a reliable and effective air-tight arrangement cannot be produced.

SUMMARY Of THE INVENTION

In light of the forgoing, a need exists for an improved brake booster apparatus that is able to overcome the above drawbacks.

In one respect, it would be desirable to provide a brake booster apparatus which can achieve a relatively precise air-tight arrangement between the air control seat and the air control seal.

It would also be desirable to provide a brake booster apparatus that is designed in a way that simplifies the assembly process.

In accordance with the present invention, a vehicle brake booster apparatus includes a housing, a movable wall positioned within the interior of the housing to divide the interior into a constant pressure chamber and a variable pressure chamber, a power piston connected to the movable wall for moving in response to movement of the movable wall, an axially movable input rod extending outwardly from the power piston for connection to a brake pedal, and an axially movable valve plunger mounted within the power piston and operatively connected to the input rod. A control valve is positioned within the power piston for controlling communication of the variable pressure chamber with atmospheric air. The control valve includes an air control valve and a vacuum control valve, with the air control valve including an air control seal arranged between the valve plunger and a valve body portion of the control valve. The air control seal has a radially outwardly located peripheral portion which possesses an elasticity that is greater than the elasticity of a radially inwardly located portion of the air control seal to thereby provide an effective air-tight seal.

According to another aspect of the present invention, a vehicle brake booster apparatus includes a housing, a movable wall positioned within the interior of the housing to divide the interior into a constant pressure chamber and a variable pressure chamber, a power piston connected to the movable wall for moving in response to movement of the movable wall, an axially movable input rod extending outwardly from the power piston for connection to a brake pedal, and an axially movable valve plunger mounted within the power piston and operatively connected to the input rod. A vacuum control valve controls communication between the constant pressure chamber and the variable pressure chamber, while an air control valve controls communication between the variable pressure chamber and atmospheric air. The air control valve includes an air control seal engageable with the valve plunger upon axial movement of the input rod. The air control seal includes a deformable engaging portion that engages a valve body portion to effect an air-tight seal and at least one receiving portion positioned adjacent the engaging portion to receive a deformed part of the engaging portion.

BRIEF DESCRIPTION OF THE DRAWING FIGURES

Other features and aspects of the present invention will become more readily apparent from the following detailed description considered with reference to the accompanying drawing figures in which like reference numerals designate like elements and wherein.

DETAILED DESCRIPTION OF THE INVENTION

Figure 1:
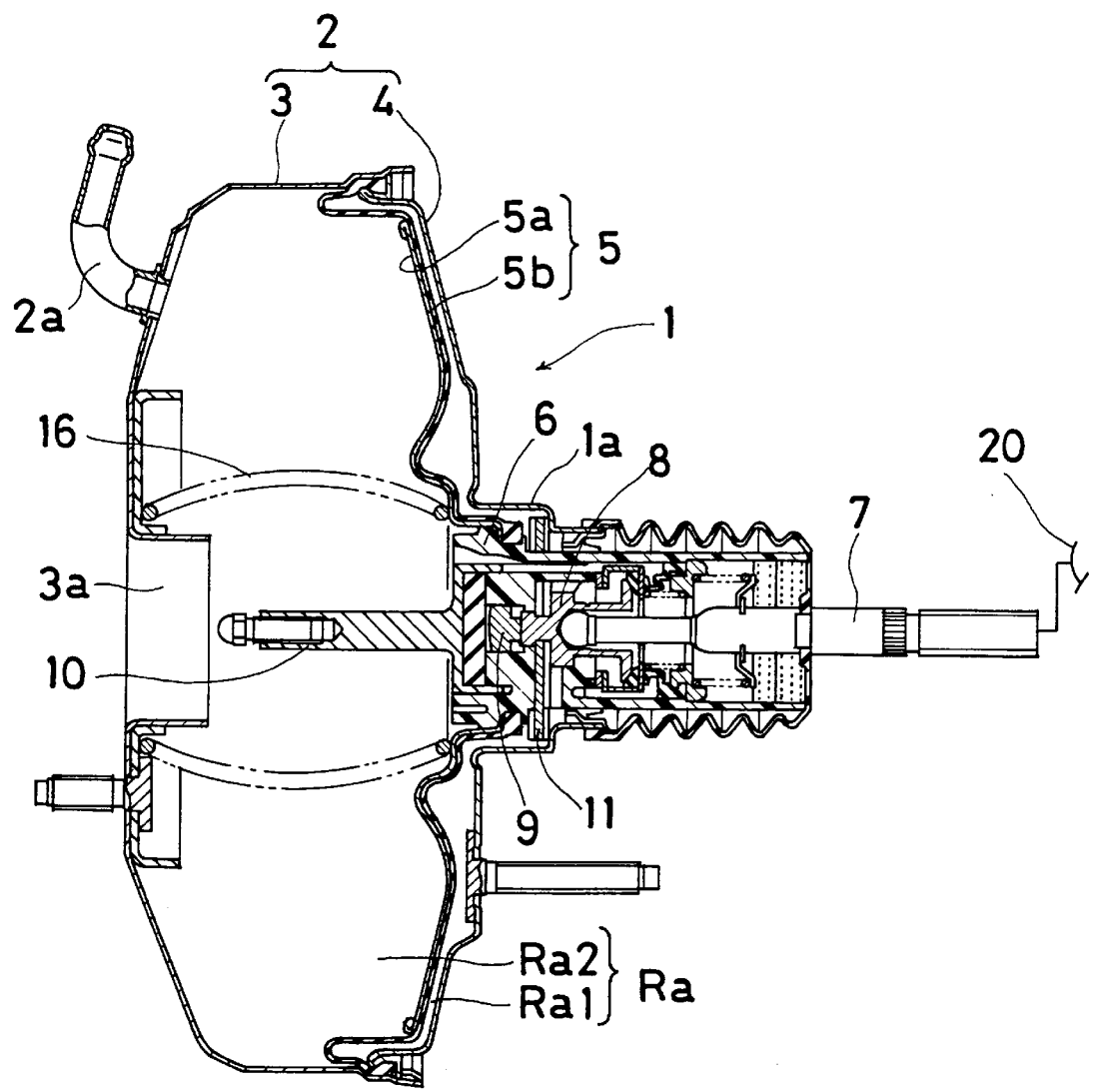
FIG. 1 is a cross-sectional view of the brake booster apparatus according to the present invention.
Figure 2:
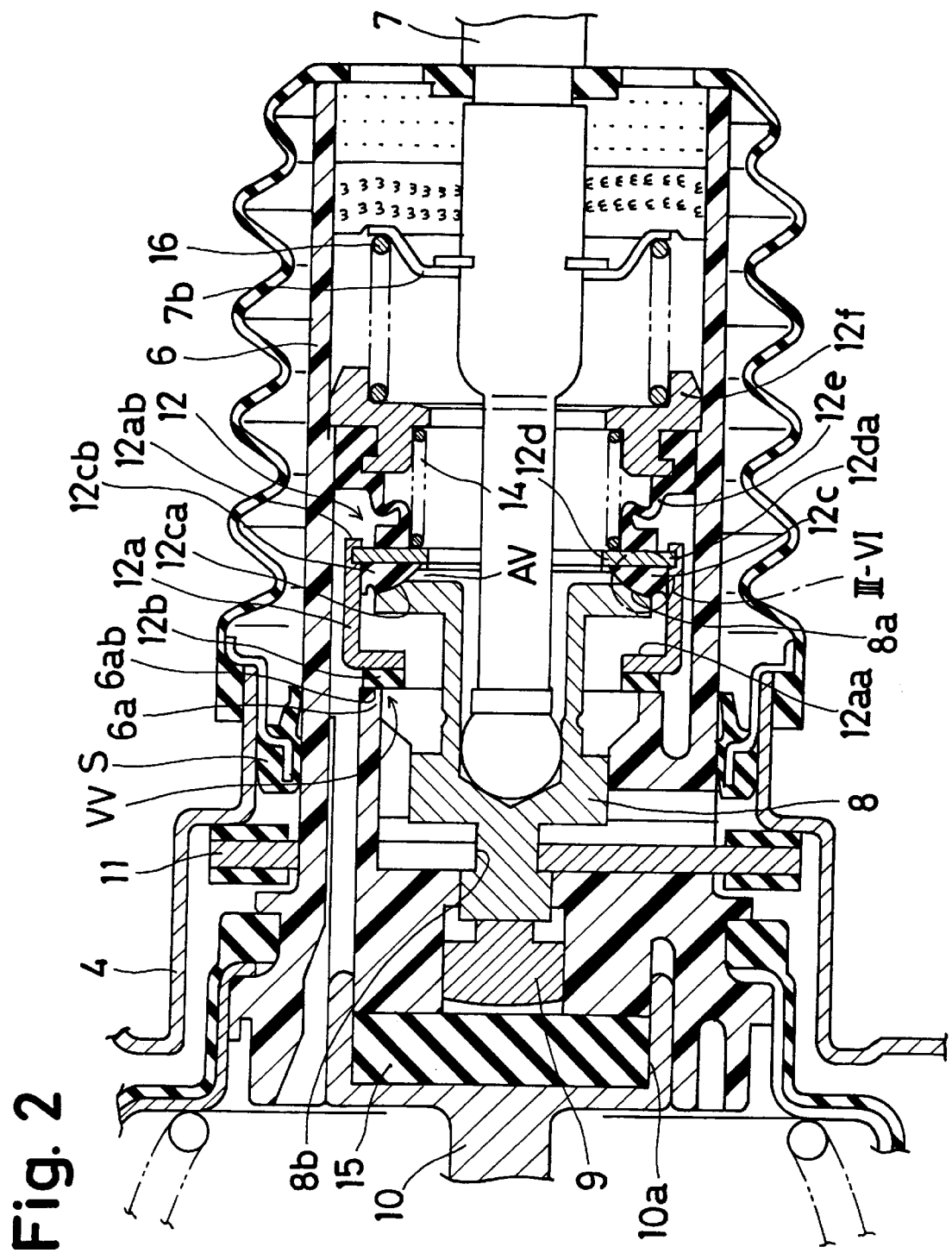
FIG. 2 is an enlarged cross-sectional view of a portion of the brake booster apparatus shown in FIG. 1.

With reference to FIG. 1, which is a cross-sectional view taken along the direction of the input/output shaft of the brake booster apparatus, and FIG. 2, the brake booster apparatus 1 is adapted to be applied to a vehicle. The brake booster 1 has a projecting portion 1a on its input side communicating with atmospheric air and also has a substantially conically-shaped housing 2 on its outlet side having an inlet connector 2a communicating with a negative pressure source such as the intake manifold of an engine. The housing 2 includes a front shell 3 and a rear shell 4 that are connected to one another to define a pressure chamber Ra within the interior of the housing. The front shall 3 has an opening 3a for accommodating a master cylinder body.

A tube in the shape of bellows which is adapted to be moved substantially in the direction along the input/output shaft is connected to the end face of the projecting portion 1a of the housing 2. Additionally, an input rod 7 is connected to the end face of the projecting portion 1a of the housing 2. The input rod 7 is connected to a vehicle brake pedal 20 as schematically shown in FIG. 1. Disposed within the housing 2 and the bellows-shaped tube is a power piston 6. The power piston 6 is provided with two coaxially arranged tubular elements between which is defined a fluid passage.

A movable wall 5 is positioned within the housing 2 to divide the pressure chamber Ra into a variable pressure chamber Ra1 and a constant pressure chamber Ra2. The movable wall is composed of a ring plate 5a secured to a diaphragm 5b. The outer peripheral part of the diaphragm 5b is supported by the housing 2 for maintaining air-tight conditions within the variable pressure chamber Ra1 and the constant pressure chamber Ra2. The inner peripheral end of the movable wall 5 is supported on the outer periphery of the power piston 6 for maintaining air-tightness of the variable pressure chamber Ra1 and the constant pressure chamber Ra2. A seal S is also disposed between the rear shell 4 and the power piston 6 for maintaining air-tight conditions within the variable pressure chamber Ra1 and the constant pressure chamber Ra2.

Located within the power piston 6 is an air cleaner disposed at the input end, the input rod 7, a first valve plunger 8, a second valve plunger 9, a control valve 12, and an output rod 10. The first plunger 8 is slidably arranged in the power piston 6 and a key 11 is provided to restrict or limit the movement of the first plunger 8. The key 11 is positioned so that it extends into a recessed portion 8b of the first valve plunger 8. A ball joint portion is formed at the output end of the input rod 7. This ball joint portion serves as the connection mechanism for securely connects the input rod 7 to the first valve plunger 8.

The output rod 10 is operatively connected to the power piston 6. A cup-shaped recess portion 10a is formed in the end face of the output rod 10 and a reaction disc 15 is positioned in the cup-shaped recess portion 10a to establish a reaction force. The reaction force is applied to the first valve plunger 8 and the second valve plunger 9 to control the control valve 12.

The control valve 12 is arranged between the input rod 7 and the first and second valve plungers 8, 9 for controlling communication between and the pressure balance between the constant pressure chamber Ra2 and the variable pressure chamber Ra1. The control valve 12 is comprised of an air control valve AV and a vacuum control valve VV. The air control valve AV controls communication of the variable pressure chamber Ra1 with atmospheric air while the vacuum control valve VV controls communication between the constant pressure chamber Ra2 and the variable pressure chamber Ra1.

The air valve AV includes an elastic portion 12e, an air control seal 12c and an air control seat 8a which is formed on the end of the first valve plunger 8. The vacuum control valve VV includes a vacuum control seal 12b and a vacuum control seat 6a which is formed on the end of the radially inwardly located cylindrical portion of the power piston 6. The vacuum control seal 12b is fixed by an adhesive material to a radially inwardly extending flange portion 12aa provided on an axially extending valve body portion 12a of the control valve 12. The air control seal 12c is fixed to a radially extending ring shaped plate 12d and is tightly engaged with the valve body portion 12a as shown in FIG. 2. The plate 12d is tightly engaged with the valve body portion 12a at an engaging portion 12da formed on the valve body portion 12a. This engagement can be effected by crimping the plate 12d at the end of the valve body portion 12a.

The air control seal 12c and the air control seat 8a form an air sealing portion 12ca while the vacuum control seal 12b and the vacuum control seat 6a form an air sealing portion 6ab. The air sealing portion 12ca and the air sealing portion 6ab are designed so that the radial distance between the center axis of the input rod 7 and the air sealing portion 12ca is smaller than the radial distance between the center axis of the input rod 7 and the air sealing portion 6ab.

A spring retainer 7b is mounted on the outer periphery of the input rod 7 while a retainer 12f is mounted on the inner surface of the power piston 6. The retainer 12f is tightly secured to the power piston 6. A return spring 16 is interposed under compression between the spring retainer 7b and the retainer 12f. Also, a valve spring 14 is positioned under compression between the retainer 12f and the plate 12d. Further, an elasticity portion 12e is located between the retainer 12f and the plate 12d.

The air control seal 12c is fixed to the ring plate 12d by an adhesive material. Further, as noted above, the air control seal 12c is engaged with the inner surface of the valve body portion 12a for maintaining an air-tight arrangement. An engaging portion 12cb is formed at the radially outwardly located outer peripheral portion of the air control seal 12c. The engaging portion 12cb is adapted to engage the inner surface of the valve body portion 12a.

Figure 3:
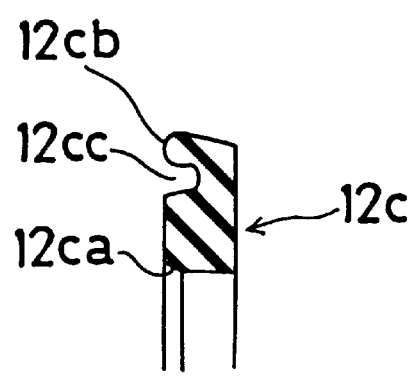
FIG. 3 is a cross-sectional view of a first embodiment of the air control seal used in the brake booster apparatus according to the present invention.

FIG. 3 illustrates, in an enlarged manner, the air control seal 12c before the air control seal 12c is assembled into the brake booster apparatus. As seen in FIG. 3, the air control seal 12c has a sealing portion 12ca which is adapted to contact the air control seat 8 and the engaging portion 12cb which is provided at the radially outward peripheral portion of the air control seal 12c. The engaging portion 12cb is adapted to primarily deform when the air control seal 12c is assembled into the brake booster, with a small amount of additional deformation possibly occurring when the air control seal contacts the air control seat 8a. Further, the air control seal 12c is provided with a generally axially extending recess that serves as a receiving portion 12cc. The receiving portion 12cc is located between the sealing portion 12ca and the engaging portion 12cb. The recess or receiving portion 12cc is adapted to receive or accommodate the aforementioned deformation of the air sealing portion 12ca. The air control seal 12c is designed so that the elasticity or elasticity value associated with the engaging portion 12cb is larger than that associated with the air sealing portion 12ca. This greater elasticity of the engaging portion 12cb relative to the engaging portion 12cb is achieved by virtue of the presence of the recess or receiving portion 12cc. When the air control seal 12c is assembled with respect to the valve body portion 12a and the plate 12d in the manner shown in FIG. 2, the air sealing portion 12ca does not deform.

In a known manner, during operation of the vacuum brake booster apparatus, the movable wall 5 moves towards the output side in a direction substantially along the input/output shaft by atmospheric air flowing into the variable pressure chamber Ra1 while the constant pressure chamber Ra2 is under negative pressure. The power piston 6 is thus moved towards the outlet side in a direction substantially along the input/output shaft to effect stroke movement.

The variable pressure chamber Ra1 is selectively communicated with or prevented from communicating with atmospheric air by the air control valve AV on the input side end of the first valve plunger 8. The second valve plunger 9 is connected to the first valve plunger 8 at the output side end of the first plunger 8. The variable pressure chamber Ra1 and the constant pressure chamber Ra2 are selectively communicated with or prevented from communicating with each other by the vacuum control valve VV. The constant pressure chamber Ra2 communicates via the inlet connector 2a with the engine intake manifold operating as a negative pressure source so that the constant pressure chamber Ra2 is perpetually under a negative pressure condition. According to the pressure balance between the variable pressure chamber Ra1 and the constant pressure chamber Ra2, the vacuum control seat 6a is in engagement with or out of engagement with the vacuum control seat 12b while the air control seat 8a is in engagement with or out of engagement with the air control seal 12c.

Figure 4:
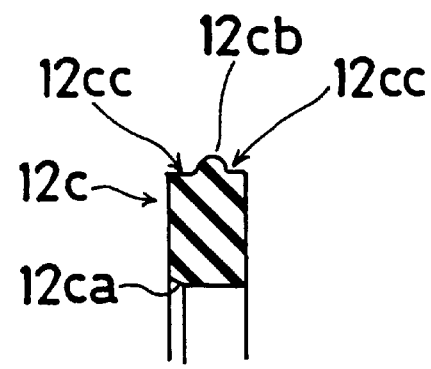
FIG. 4 is a cross-sectional view of a second embodiment of the air control seal used in the brake booster apparatus according to the present invention.

FIG. 4 illustrates a second embodiment of the air control seal 12c before the air control seal 12c is assembled within the brake booster apparatus. The air control seal 12c according to the second embodiment has axially extending escape or receiving portions 12cc at the radially outer portion of the air control seal 12c. Further, the air control seal 12c is provided with an engaging portion 12cb which faces the inner surface of the valve body portion 12a. This engaging portion 12cb is adapted to engage the inner surface of the valve body portion 12a and is located between the two receiving portions 12cc. The engaging portion is in the form of a rounded or hemispherical protuberance. The protuberance extends radially outwardly from the radially outwardly located end face of the air control seal 12c. The air control seal 12c is designed so that the elasticity or elasticity value associated with the engaging portion 12cb is larger than that associated with the air sealing portion 12ca. Once again, this greater elasticity of the engaging portion 12cb relative to the air sealing portion 12ca is achieved by virtue of the presence of the receiving portions 12cc. When the air control seal 12c is assembled with respect to the valve body portion 12a and the plate 12d in the manner shown in FIG. 2, the engaging portion 12cb deforms and the deformation is accommodated or received by the receiving portions 12cc. In this way, a reliable airtight arrangement is established. Also, when the air control seal 12c is assembled with respect to the valve body portion 12a and the plate 12d in the manner shown in FIG. 2, although the engaging portion 12cb deforms during operation, the air sealing portion 12ca does not deform.

Figure 5:
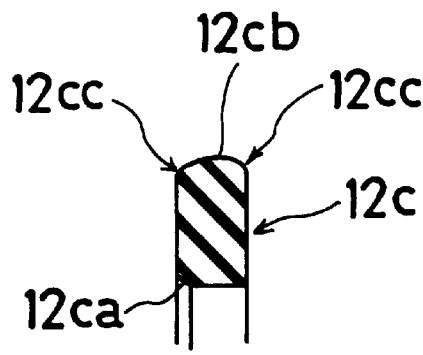
FIG. 5 is a cross-sectional view of a third embodiment of the air control seal used in the brake booster apparatus according to the present invention.

FIG. 5 depicts a third embodiment of the air control seal 12a before the air control seal 12c is assembled within the brake booster apparatus. The air control seal 12c according to the third embodiment is designed so that the radially outer peripheral portion of the air control seal 12c possesses a tapering or generally convex shape defining an engaging portion 12cb that is positioned between two escape or receiving portions 12cc. This radially outer peripheral portion tapers from the axial midpoint of the air control seal 12c towards the opposite surfaces of the air control seal 12c. Thus, the air control seal possess its greatest radial dimension substantially at the intermediately located engaging portion 12cb. The engaging portion 12cb faces the inner surface of the valve body portion 12a and is adapted to engage the inner surface of the valve body portion 12a. The air control seal 12c is designed so that the elasticity or elasticity value associated with the engaging portion 12cb is greater than that associated with the air sealing portion 12ca. The greater elasticity of the engaging portion 12cb relative to the air sealing portion 12ca is achieved by virtue of the presence of the receiving portions 12cc. When the air control seal 12c is assembled with respect to the valve body portion 12a in the manner shown in FIG. 2, the engaging portion deforms and a reliable air-tight arrangement is achieved. Also, when the air control seal 12c is assembled with respect to the valve body portion 12a and the plate 12d in the manner shown in FIG. 2, the deformed part of the engaging portion 12cb is received in or accommodated by the escape portion 12cc, and the air sealing portion 12ca does not deform.

Figure 6:
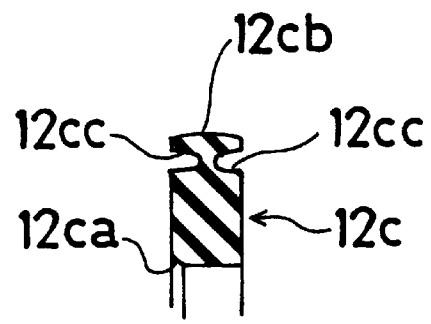
FIG. 6 is a cross-sectional view of a fourth embodiment of the air control seal used in the brake booster apparatus according to the present invention.

A fourth embodiment of the air control seal 12c before the air control seal 12c is assembled within the brake booster apparatus is shown in FIG. 6. In this embodiment, the air control seal 12c possesses opposing recesses on opposite sides of the air control seal 12c that serve as escape or receiving portions 12cc. The opposing recesses 12cc are positioned adjacent the radially outwardly located portion of the air control seal 12c. Further, the air control seal 12c is provided with an engaging portion 12cb which faces the inner surface of the valve body portion 12. Thus, the engaging portion is located between the sealing portion 12ca and the engaging portion 12cb. The air control seal 12c shown in FIG. 6 is designed so that the elasticity or elasticity value associated with the engaging portion 12cb is greater than that associated with the air sealing portion 12ca. This greater elasticity of the engaging portion 12cb relative to the air sealing portion 12ca is achieved by virtue of the presence of the receiving portions 12cc. When the air control seal 12c is assembled with respect to the valve body portion 12a in the manner shown in FIG. 2, the engaging portion 12cb is deformed and an effective airtight arrangement is achieved. Also, when the air control seal 12c is assembled with respect to the valve body portion 12a and the plate 12d in the manner depicted in FIG. 2, the part of the engaging portion 12cb that is deformed is received in the recesses or receiving portions 12cc, and the air sealing portion 12ca does not deform.

The vacuum brake booster apparatus of the present invention is quite advantageous in that a reliable and effective air-tight seal can be achieved between the air control seal and the air control seat when the air control seal is assembled within the apparatus. Thus, the problems associated with other known apparatus in effecting an air-tight engagement of the air control seal and the air control seat are avoided.

The principles, preferred embodiments and modes of operation of the present invention have been described above. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A brake booster apparatus for a vehicle comprising:

a housing having an interior;

a movable wall positioned within the interior of the housing to divide the interior into a constant pressure chamber and a variable pressure chamber, said movable wall being movable in response to a pressure differential between the variable pressure chamber and the constant pressure chamber;

a power piston connected to said movable wall for moving in response to movement of said movable wall;

an axially movable input rod extending outwardly from said power piston for connection to a brake pedal;

an axially movable valve plunger mounted within said power piston and operatively connected to said input rod; and a control valve positioned within the power piston for controlling communication of said variable pressure chamber with atmospheric air, said control valve including an air control valve and a vacuum control valve, said air control valve including an air control seal arranged between said valve plunger and a valve body portion of said control valve, said air control seal having a radially outwardly located peripheral portion which possesses an elasticity that is greater than the elasticity of a radially inwardly located portion of the air control seal.

2. A brake booster apparatus for a vehicle as set forth in claim 1, wherein said air control seal has at least one recessed portion located adjacent a radially outward outer periphery of said air control seal.

3. A brake booster apparatus for a vehicle as set forth in claim 1, wherein said air control seal has a pair of opposing recessed portions located adjacent a radially outward outer periphery of said air control seal.

4. A brake booster apparatus for a vehicle as set forth in claim 1, wherein said air control seal includes a radially outwardly located end face provided with a radially extending protuberance.

5. A brake booster apparatus for a vehicle as set forth in claim 1, wherein said air control valve includes a ring-shaped plate.

6. A brake booster apparatus for a vehicle as set forth in claim 3, wherein said ring shaped plate is engaged with said valve body portion by crimping.

7. A brake booster apparatus for a vehicle as set forth in claim 1, wherein said air control seal includes a radially outwardly located end face that is rounded.

8. A brake booster apparatus for a vehicle comprising:
a housing having an interior;
a movable wall positioned within the interior of the housing to divide the interior into a constant pressure chamber and a variable pressure chamber, said movable wall being movable in response to a pressure differential between the variable pressure chamber and the constant pressure chamber;
a power piston connected to said movable wall for moving in response to movement of said movable wall;
an axially movable input rod extending outwardly from said power piston for connection to a brake pedal;
an axially movable valve plunger mounted within said power piston and operatively connected to said input rod;
a vacuum control valve for controlling communication between the constant pressure chamber and the variable pressure chamber;
an air control valve for controlling communication between the variable pressure chamber and atmospheric air, said air control valve including an air control seal engageable with said valve plunger upon axial movement of said input rod, said air control seal including a deformable engaging portion that engages a valve body portion and is deformed radially inwardly to effect an air-tight seal and at least one receiving portion positioned adjacent the engaging portion to receive a radially inwardly deformed part of the engaging portion.

9. A brake booster apparatus for a vehicle as set forth in claim 8, wherein said air control seal includes an air sealing portion that engages the valve plunger upon axial movement of the input rod, said at least one receiving portion being a recess provided in the air control seal, said at least one recess being positioned between the engaging portion and the air sealing portion.

10. A brake booster apparatus for a vehicle as set forth in claim 9, wherein said recess extends axially.

11. A brake booster apparatus for a vehicle as set forth in claim 8, wherein said air control seal includes an air sealing portion that engages the valve plunger upon axial movement of the input rod, said at least one receiving portion being a pair of opposing recesses provided in the air control seal, said recesses being positioned between the engaging portion and the air sealing portion.

12. A brake booster apparatus for a vehicle as set forth in claim 11, wherein said recesses extend axially.

13. A brake booster apparatus for a vehicle as set forth in claim 8, wherein said air control seal includes a radially outwardly located end face, said engaging portion being a radially outwardly extending protuberance provided on said radially outwardly located end face, said at least one receiving portion being defined by portions of the radially outwardly located end face of the air control seal positioned on opposite sides of the protuberance.

14. A brake booster apparatus for a vehicle as set forth in claim 8, wherein said air control seal includes a radially outwardly located end face that is rounded, said rounded end face having an axially intermediate portion defining the engaging portion and an axially end portion defining the at least one receiving portion.

15. A brake booster apparatus for a vehicle as set forth in claim 8, wherein said air control valve includes a ring-shaped plate, said air control seal being secured to said ring-shaped plate.

16. A brake booster apparatus as set forth in claim 8, wherein said receiving portion includes a recess.

17. A brake booster apparatus as set forth in claim 8, wherein said deformable engaging portion is provided on a radially outwardly located peripheral portion of the air control seal.

18. A brake booster apparatus as set forth in claim 8, wherein said deformable engaging portion is provided on a radially outwardly facing portion of the air control seal.

* * * * *

UNITED STATES PATENT AND TRADEMARK OFFICE
CERTIFICATE OF CORRECTION

PATENT NO. : 5,904,088
DATED : May 18, 1999
INVENTOR(S) : OGURA, et al.

It is certified that error appears in the above-indentified patent and that said Letters Patent is hereby corrected as shown below:

On the cover page, the following is added:

[30]  Foreign Application Priority Data

Sept. 27, 1997  [JP]  Japan ................ 8-256529 (P)

Signed and Sealed this

Twenty-second Day of February, 2000

Attest:

Q. TODD DICKINSON

*Attesting Officer*　　　　*Commissioner of Patents and Trademarks*